REMOTE CONTROL SYSTEM INCLUDING CIRCUITRY FOR SUPERIMPOSING HIGHER FREQUENCY CONTROL SIGNALS ON A SUPPLY LINE CARRIER WAVE

Filed Aug. 30, 1965 4 Sheets-Sheet 1

INVENTOR
WILMER C. ANDERSON by: Louis Altman

ATTY.

INVENTOR
WILMER C. ANDERSON by: Louis Altman

ATTY.

Aug. 12, 1969 W. C. ANDERSON 3,461,428

REMOTE CONTROL SYSTEM INCLUDING CIRCUITRY FOR SUPERIMPOSING HIGHER FREQUENCY CONTROL SIGNALS ON A SUPPLY LINE CARRIER WAVE

Filed Aug. 30, 1965 4 Sheets-Sheet 3

INVENTOR
WILMER C. ANDERSON by: Louis Altman

ATTY.

INVENTOR
WILMER C. ANDERSON by: Louis Altman
ATTY.

United States Patent Office 3,461,428

Patented Aug. 12, 1969

3,461,428

REMOTE CONTROL SYSTEM INCLUDING CIRCUITRY FOR SUPERIMPOSING HIGHER FREQUENCY CONTROL SIGNALS ON A SUPPLY LINE CARRIER WAVE

Wilmer C. Anderson, Greenwich, Conn., assignor to General Time Corporation, New York, N.Y., a corporation of Delaware Filed Aug. 30, 1965, Ser. No. 483,674
Int. Cl. H04q *9/00, 9/08;* H04m *11/04*
U.S. Cl. 340—147 20 Claims

ABSTRACT OF THE DISCLOSURE

A remote control system associated with an A-C supply line wherein control signals are selectively superimposed on respective opposite polarity half cycles of an A-C power line voltage wave which functions as a carrier wave. The control signals are superimposed on the supply line carrier, and a phase shifting network is provided for controlling the phase relationship between the control signal and the carrier so as to superimpose the control signal on the carrier at different prescribed time intervals during selected half cycles to provide a plurality of different control channels. The control signals are utilized to actuate a plurality of separate remotely located receivers each of which is responsive to the frequency of the control signal, and includes a phase shifting network for detecting a control signal at a preselected one of the prescribed time intervals during a selected half cycle at the carrier for controlling a desired operation.

This invention relates generally to remote control systems and, more particularly, to an improved central program device which turns on and off various electrical appliances at remote locations without the necessity for any specific electrical interconnection between the central program device and the remote appliances other than interconnection through a common power supply line.

It is a primary object of the present invention to provide an improved remote control system in which the control signals are superimposed on a supply line carrier wave. More particularly, it is an object of this invention to provide such a remote control system in which the control signal is superimposed on an alternating supply line carrier wave for only a short period during a selected half cycle of the alternating carrier wave.

It is another object of this invention to provide a remote control system of the foregoing type having a plurality of control channels each of which is capable of controlling a different remote electrical appliance, and in which the different channels may be produced by the use of a single frequency control signal. A related object is to provide such a remote control system including a plurality of receiving devices, each of which is responsive to a different control channel even though the various channels are produced by the use of a single frequency control signal. A subsidiary object of the invention is to provide receiving devices of the foregoing type which are adjustable for tuning to different control channels so that a given receiver can be used on any desired channel.

It is a further object of one particular aspect of this invention to provide a remote control system of the above type which is capable of providing a relatively large number of control channels by the use of only a single frequency control signal.

Still another object of the invention is to provide a remote control system in which control signals superimposed on an alternating carrier wave during one polarity half cycles of the carrier wave may be used to turn an appliance on, and signals superimposed during the opposite polarity half cycles may be used to turn the same appliance off. In this connection, it is a related object to provide receiver means for responding to such signals in order to turn the appliance on and off according to the polarity of the carrier wave half cycle containing the control signal.

Other objects and advantages of the invention will become apparent upon reading the following detailed description and upon reference to the drawings, in which.

Figure 1:
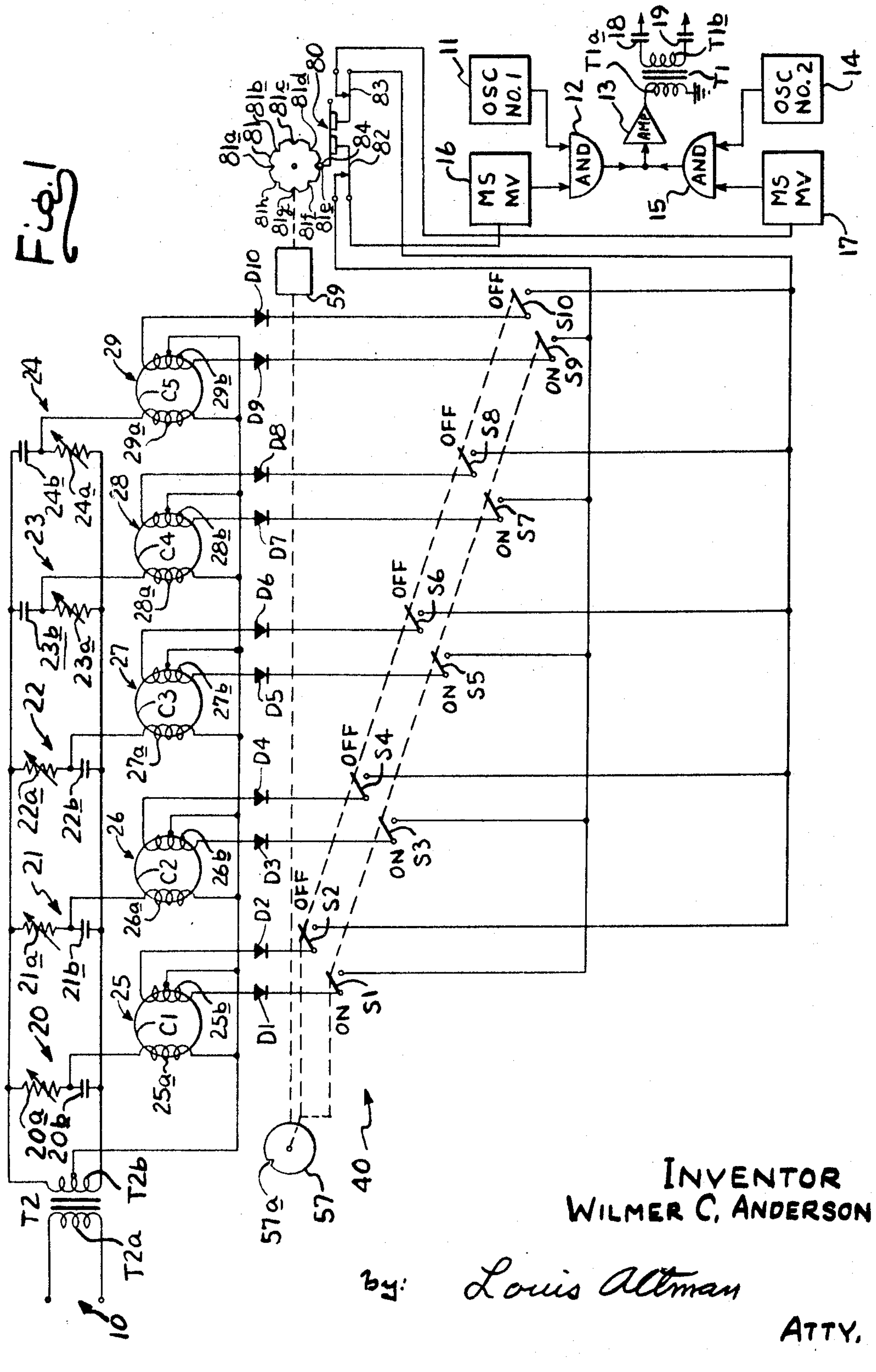
FIGURE 1 is a schematic diagram of a remote control system transmitter embodying the present invention.

Turning now to the drawings, the A-C supply line indicated at 10 in FIG. 1 supplies power to a plurality of remote electrical appliances not shown and also to a control system including a transmitter and a plurality of remote receivers associated with the various appliances to be controlled. The transmitter includes circuitry for superimposing control signals on the supply line carrier wave, and each receiver is tuned to respond to a particular control signal. In order to permit a plurality of different receivers, and thus a plurality of electrical appliances, to be controlled by a single transmitter, the transmitter is adapted to provide a plurality of different control channels so that each receiver may be adjusted to respond to a preselected channel.

For the purpose of selecting the particular time of day when each appliance is to be operated by the remote control system, the transmitter also includes plurality of manually operated time control means for setting a particular time, typically in units of quarter hours, when a control signal is to be transmitted over each channel. Consequently, any appliance may be actuated at a preselected time by simply adjusting the receiver associated with that appliance to respond to a particular channel, and then making an appropriate setting on the transmitter to transmit a control signal over that particular channel at the desired time. For the purpose of turning the appliances off as well as on, the control signals are preferably superimposed during one polarity half cycle of the carrier wave to turn an appliance on, and during the opposite polarity half cycle to turn the same appliance off. A remote control system of this general type has already been described and claimed in copending application Ser. No. 393,131, entitled, "Remote Control System Including Circuitry for Superimposing Control Signals on a Supply Line Carrier Wave," filed Aug. 31, 1964, which is assigned to the assignee of the present application.

In accordance with one aspect of the present invention, there is provided an improved transmitter for superimposing control signals on an A-C supply line carrier wave, which transmitter comprises the combination of an oscillator for providing an alternating output having a desired frequency, means responsive to the oscillator output for superimposing a control signal corresponding to the oscillator output on the supply line carrier wave, and means for controlling the superimposing means to superimpose the control signal on the carrier wave during predetermined portions of selected half cycles of the carrier wave so as to provide a plurality of different control channels. Thus, referring to the illustrative embodiment of FIG. 1, an oscillator 11 is provided for producing an alternating output of predetermined frequency which is passed through an AND gate 12 and an amplifier 13 and superimposed on the A-C supply line carrier wave by means of a transformer T1. As will be described in more detail below, the oscillator 11 provides controls signals only for turning the remote electrical appliances on, while a second oscillator 14 provides control signals to an AND gate 15 for turning the remote appliances off. The two oscillators 11 and 14 may be similar in design, preferably of the type described in U.S. patent application Ser. No. 210,410 filed July 17, 1962, and may be conveniently powered by the same A-C supply line 10 which powers the transmitter and receivers. The oscillators should produce outputs having a substantially higher frequency than that of the carrier wave; for example, in the typical case of a 60-c.p.s. carrier wave, the oscillators 10 and 14 suitably produce outputs having a frequency of about 10,000 c.p.s.

Both the AND gates 12 and 15 and the amplifier 13 are of a conventional nature and serve to control the application of the oscillator outputs to the primary winding **T1*a* of the transformer T1. The opening and closing of the AND gates 12 and 15 to pass the oscillator outputs is controlled by a pair of conventional monostable multivibrators 16 and 17, respectively, which in turn are controlled by a selective switching network to be described below. The secondary winding T1*b* of the transformer T1 is connected across the supply line through capacitors 18 and 19 so that signals induced in the secondary winding T1*b* in response to the production of signals in the primary winding T1*a* are superimposed on the supply line voltage. In other words, the signals induced in the secondary of the transformer T1 constitute the desired control signals. Since the input of the amplifier 13 is connected to the output of the gates 12 and 15, the operation of the amplifier and thus the production of a signal in the primary winding of the transformer T1 is effectively controlled by the gates 12 and 15**.

In order to provide a plurality of different control channels for activating different remotely located receivers, means are provided for controlling the gates 12 and 15 to superimpose the control signal on the carrier wave during predetermined portions of selected half cycles of the carrier wave. Thus, a plurality of phase shifting networks 20 through 24 are operatively connected between the supply line 10 and the monostable multivibrators 16, 17 for controlling the time relationship between the carrier wave and the oscillator output signals. More particularly, each of the phase shifting networks comprises a series arrangement of a variable resistor **20*a* through 24*a* and a capacitor 20*b* through 24*b* with each R-C network being connected in parallel with the other R-C networks and with the secondary winding T2*b* of a transformer T2 which has its primary winding T2*a* connected to the main A-C supply line 10. Consequently, it can be seen that the supply line voltage is applied across each of the parallel phase shifting networks 20 through 24 with each phase shifting network adjusting the phase of the applied voltage according to the particular values of the resistors 20*a*–24*a* and capacitors 20*b*–24*b*** making up such networks. Although this particular embodiment of the present invention has been illustrated as including five different phase shifting networks to provide five different control channels, it will be understood that any desired number of phase shifting networks may be utilized to provide a corresponding number of control channels by following the teachings of this invention.

For the purpose of converting the supply line voltage applied to the various phase shifting networks, to pulses for actuating the multivibrators 16 and 17, each of the phase shifting networks 20–24 is operatively connected to one of a plurality of magnetic core devices 25 through 29. The magnetic core devices 25–29 include primary windings **25*a* through 29*a* which are operatively connected between respective phase shifting networks 20–24 and the A-C supply line 10 for inducing magnetic flux in the respective cores, and secondary windings 25*b* through 29*b* which are operatively associated with the multivibrators 16 and 17 for producing the desired periodic output pulses for actuating the multivibrators. The magnetic cores C1–C5 of the devices 25–29** are formed of a readily saturable magnetic material having a generally rectangular hysteresis loop, such material being commercially sold, for example, by G. L. Electronics Company under the name "Orthonik" type P1040. A given volt-seconds' excitation product per turn of winding is required to drive each core from its negative residual flux to the negative saturation level.

Considering the operation of the first magnetic core device 25, as the supply line voltage is applied across the phase shifting network 20 and the primary winding **25*a*, each positive half cycle of the supply voltage drives the magnetic core C1 to positive saturation. At the end of each positive half cycle, the change in core flux induces an output pulse in the secondary core winding 25*b*. For convenience in the ensuing description, it will be assumed herein that the secondary winding of each magnetic core device is adapted to produce a negative output pulse in response to each positive half cycle of the supply line carrier wave. Conversely, each negative half cycle of the supply voltage applied to the primary winding 25*a* drives the magnetic core C1 from positive to negative saturation, with the change in core flux as the end of each negative half cycle inducing a positive pulse in the secondary core winding 25*b***.

Thus, it can be seen that the magnetic core switches from one condition of saturation to the other condition of saturation and back again in response to the alternating polarity of the half cycles of the supply voltage, with the core output pulse alternating in polarity in synchronism with the input voltage. For each positive half cycle of the core input, the core produces a negative pulse output, while for each negative half cycle of the core input, the core produces a positive pulse output. Although this description has been made with particular reference to the operation of the first magnetic core device 25, it will be understood that each of the other core devices 26–29 operates in a similar manner.

It will be appreciated that the time relationship between the various magnetic core output pulses and the corresponding half cycles of the supply line carrier wave is determined by the phase shifting networks which control the phase relationship between the input voltage applied to the primary winding of each core device and the main supply line voltage. Consequently, by simply adjusting the parameters of the various phase shifting networks 20–24, the output pulses produced in the secondary windings of the magnetic core devices can be made to appear at any desired time during the respective half cycles of the supply line carrier wave. As described above, the polarity of these pulses alternates from positive to negative and negative to positive in accordance with the reversing polarity of the half cycles of the main supply voltage, but the relative timing of the pulses produced by each core device remains constant as fixed by the corresponding phase shifting network.

In accordance with one aspect of this invention, the opposite polarity of the core output pulses is utilized to select between the two oscillators 11 and 14 so as to use one of the oscillators to turn the remotely located appliances on and the other oscillator to turn the appliances off. Thus, referring again to the first core device 25 as exemplary, two opposites facing diodes D1 and D2 are connected to opposite ends of the secondary winding **25*b*** with the first diode D1 being adapted to pass negative output pulses to an "on" switch S1, and with the second diode D2 being adapted to pass positive output pulses to an "off" switch S2. The switches S1 and S2 form part of a selective switching network 40 which will be described in more detail below. Similar pairs of diodes and switches are connected to the secondary windings of each of the other magnetic core devices, 26–29. Thus, diodes D3 and D4 pass negative and positive output pulses from the secondary winding 26*b* of core C2 to a pair of "on" and "off" switches S3 and S4, respectively, diodes D5 and D6 pass negative and positive pulses from winding 27*b* to switches S5 and S6, respectively; diodes D7 and D8 pass negative and positive pulses to switches S7 and S8; and diodes D9 and D10 pass negative and positive pulses to switches S9 and S10. In other words, the pair of oppositely facing diodes associated with each magnetic core device serves to discriminate between "on" pulses and "off" pulses produced by the core devices according to the polarity of such pulses.

In order to select the desired time (during a twenty-four hour period, for example) for rendering each control channel operative, and for selecting between the "on" and "off" signals in the various channels for each selected time, the bank or network of selector switches S1–S10 is adapted to be manually preset for causing control signals to be superimposed upon selected portions of selected polarity half cycles of the supply line carrier wave at preselected times. Thus, each pair of selector switches associated with one of the magnetic core devices 25–29 represents one channel, so that each channel includes both an "on" switch and an "off" switch. For example, channel No. 1 is represented by selector switches S1 and S2, with switch S1 controlling the "on" signal and switch S2 controlling the "off" signal. Although only a single pair of "on" and "off" switches has been shown for each channel, additional switches or pairs of switches may be provided if desired, as will be apparent from the ensuring description.

The selector switches S1–S10 comprising the switching network 40 are preferably of the type described in copending application Ser. No. 443,491, filed Mar. 29, 1965, which is assigned to the assignee of the present application. For a more detailed description of an exemplary selector switch, reference is made to FIG. 5. As may be seen, the exemplary selector switch is in the form of a rotary cam-type switch and is associated with a main housing or panel 56. The switch includes a cylindrical cam member 57 which has a V notch or detent 57*a* formed therein and which is mounted on a shaft 58 for rotation therewith. The shaft 58 is driven by motor 59 through a gear arrangement 60. Since the selector switches are to be closed at preselected times during a twenty-four hour period, it will be assumed that the motor 59 is operating at one half revolution per hour and that the gear arrangement 60 has a 12:1 ratio whereby the shaft 58 and the cam member 57 make one revolution per each twenty-four hours.

A contact assembly S1 is provided for the purpose of producing an automatic switching operation and, as may be seen, includes a pair of spring-biased contact members S1*a* and S1*b* which may be respectively connected to the "on" diode D1 and to the monostable multivibrator 16. The contact assembly is secured to a cup-like wheel 62 for rotational movement therewith and the wheel has a centrally located circular aperture 62*a* for receiving the shaft 58, the aperture 62*a* having a larger diameter than the shaft 58 so that the wheel 62 may be rotated relative to the shaft and thus relative to the cam member 57. A detent spring 63 is provided for engaging detents in the inner surface of the cup-like wheel 62 so that the wheel 62 may be located in a desired angular position, the detent spring 63 being secured to a plate 56*a* forming a part of the main housing or panel 56. As will be apparent, the detents engaged by spring 63 may be so positioned around the inner surface of the wheel 62 that the selector switch may be preset to operate at a desired time during a twenty-four hour period, for example, at any selected quarter hour.

For the purpose of causing the contact members S1*a* and S1*b* to be moved into and out of engagement with one another, a V shaped cam follower 64 is formed integrally with the upper contact member S1*a*, the contact assembly being so mounted on the wheel 62 that the outer surface of the cam member 57 is engaged by the cam follower 64. When the cam follower 64 is in engagement with the non-detented portion of the cam 57, the contact members S1*a* and S1*b* are maintained in open or non-engaging positions. Conversely, when the detent 57*a* of the cam member is adjacent the cam follower 64, the cam follower is driven into the detent 57*a* by the inherent spring biasing force of the contact member 51*a* so that the contact members are moved into engagement and the switch is closed.

In view of the foregoing, it follows that if the cup-like wheel 62 is rotated until the contact assembly is in a desired relative position with respect to the cam member 57, the switch will be closed when the detent 57*a* reaches a desired angular position during each revolution of the cam members 57, such angular position corresponding to a prescribed time during each twenty-four hour period. Thus, the switch may be preset to be closed at a precise, preselected position or time during each revolution of the cam member.

For the purpose of locking the contact members S1*a* and S1*b* in the open or non-engaged position, a latching member 65 is provided which is pivotable about a shaft 65*a*. When sufficient clockwise rotational movement is imparted to the wheel 62, a lip of the latching member 65 engages under a lip of the cam follower 64 and prevents the cam follower from subsequently moving into the detent 57*a* when the detent is aligned therewith. Counterclockwise movement of the wheel 62 releases the members 64 and 65 from engagement.

Figure 5:
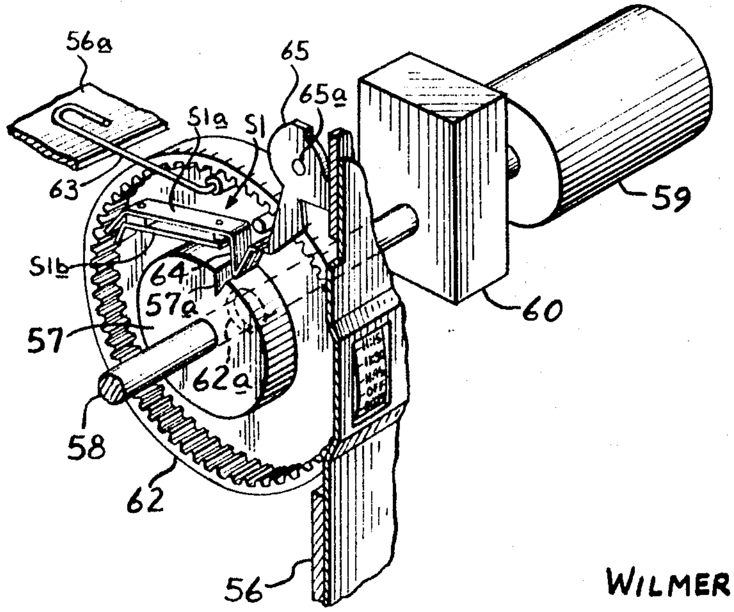
FIG. 5 is a perspective view of a selector switch arrangement suitable for use in the transmitter circuits shown in FIGS. 1 and 3.

While only a single selector switch is shown in FIG. 5, it will be understood that a plurality of such switches may be mounted on a common shaft or on commonly driven shafts. These additional switches would correspond to the other selector switches S2–S10 in the switching network 40. The construction of FIG. 5 permits each switch in the bank or network 40 to be set to close at its own selected time, independently of the others. Switch S1 is connected to the diode D1 which passes the negative or "on" pulses from the first magnetic core device 25, which pulses have a first predetermined phase relationship to the supply line carrier wave as determined by the phase shifting network 20. Consequently, whenever the switch S1 is closed by its associated control cam, the "on" pulse will be passed through the closed switch to actuate the monostable multivibrator 16. The multivibrator 16, in turn, produces an output pulse which is applied to the AND gate 12 to open the gate and transmit a signal from the oscillator 11 to the amplifier 13 and transformer T1 for superimposing the same on the supply line carrier wave.

Figure 6:
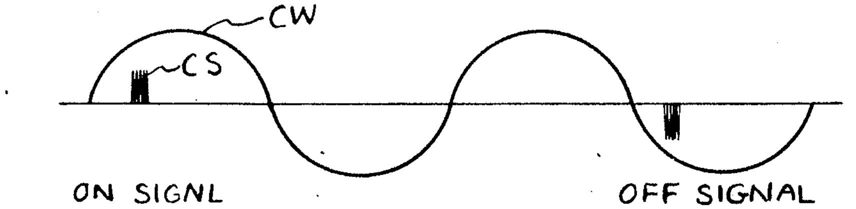
FIG. 6 is a schematic diagram of a control signal superimposed on a carrier wave in accordance with this invention.

In order that a plurality of control signals may be superimposed on any given half cycle of the carrier wave (with the different signals being distinguished from one another by their different time relationships to the carrier wave), the multivibrator 16 is designed to produce a pulse output which opens the AND gate 12 for only a brief interval so as to pass a short signal burst from the oscillator 11. The signal burst should cover only a portion of the carrier wave half cycle, and the exact upper limit on the length of the signal burst depends mainly on the number of channels provided in the particular control system involved. In the illustrated embodiment, five channels are provided and so each signal burst should be of sufficiently short duration to permit five different control signals to be superimposed on a single half cycle of the carrier wave. For example, FIG. 6 schematically illustrates a signal burst CS superimposed on a carrier wave CW for the illustrative five-channel system.

For the purpose of rendering the transmitting network operative for a one-minute time interval every fifteen minutes, i.e., as the beginning of each quarter hour, a control switch assembly 80 is interposed between the switch network 40 and the monostable multivibrators 16 and 17. The control switch assembly 80 includes a rotary contact member 81 which controls the opening and closing of contacts 82 and 83. The rotary member 81 is driven by the motor 59 and has eight slots or indents 81*a*–81*h* equally spaced around the circumference thereof which cooperate with a cam member 84 to cause the contacts 82 and 83 to be closed only when the cam member 84 is adjacent one of the slots 81*a*–81*h*. Since the rotary member 81 is driven by the motor 59 which operates at a speed of one half revolution per hour, the contacts 82 and 83 are closed once every fifteen minutes for a prescribed time period, e.g. a one-minute time period. Thus, it will be apparent that the transmitting network is rendered able to superimpose a control signal on the A-C supply voltage during a selected time interval every fifteen minutes, e.g., for one minute at the beginning of each quarter hour.

In keeping with the present invention, receiver means are provided for detecting the presence of control signals superimposed upon a supply line carrier wave and having a prescribed time relationship to the carrier wave, and for controlling a desired operation in response to the detection thereof. More specifically, a receiving network is provided for rendering a desired device, such as a home appliance, operative in response to the detection of a prescribed control signal superimposed upon first polarity half cycles of an A-C supply voltage and for rendering the device inoperative in response to the detection of a prescribed control signal superimposed upon second polarity half cycles of the A-C supply voltage.

Figure 2:
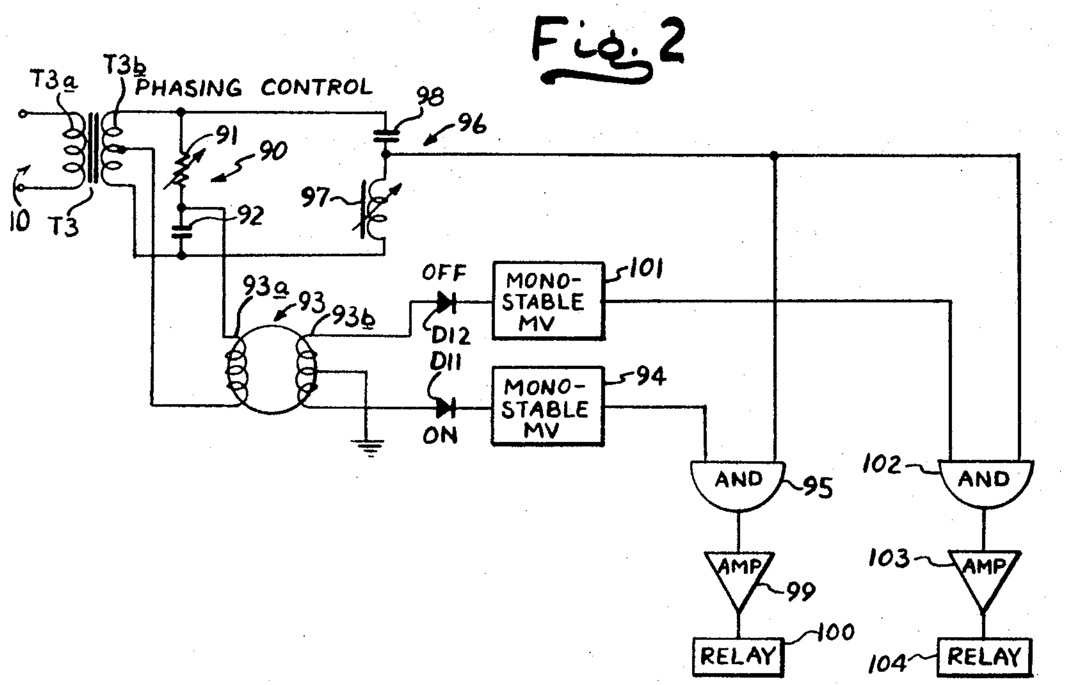
FIG. 2 is a schematic diagram of the circuit of a receiver for responding to control signals produced by the transmitter in FIG. 1.

Referring to FIG. 2, the illustrative receiving network includes a phase shifting network 90 electrically associated with the main A-C supply line 10 which powers the transmitter described above. Thus, the phase shifting network 90 comprises a series arrangement of a variable resistor 91 and a capacitor 92 with the R-C series arrangement being connected across the secondary winding T3*b* of a transformer T3 which has its primary winding T3*a* connected to the main A-C supply line 10. As in the case of the transmitter circuit described above, the phase shifting network 90 is connected to the primary winding 93*a* of a magnetic core device 93 so that output pulses induced in the secondary winding 93*b* of the core device have a prescribed time relationship to the main A-C supply voltage. In order to descriminate between "on" and "off" output pulses induced in the secondary winding 93*b*, a pair oppositely facing diodes D11 and D12 are connected to opposite ends of the secondary winding 93*b*. Thus, if a negative pulse is produced by the magnetic core device 93, corresponding to a positive half cycle of the A-C supply voltage, such pulse is passed by the "on" diode D11 to a monostable multivibrator 94 which responds by producing an output pulse to open an AND gate 95 for a brief interval.

For the purpose of detecting a control signal which is superimposed on the supply line carrier wave during the brief interval when the AND gate 95 is open, a tank circuit 96 is electrically associated with the supply line through transfromer T3, and is turned to detect the presence of a control signal having the prescribed frequency generated by the oscillator 11 in the transmitter circuit. As may be seen, the tank circuit 96 comprises a variable inductive member 97 which is coupled by means of the transformer T3 to the A-C supply line through a capacitor 98. Whenever a control signal having the prescribed frequency generated by oscillator 11 appears on the carrier wave, the tank circuit 96 responds by applying an input voltage to the AND gate 95. However, this does not result in an output from the AND gate 95 unless the input from the tank circuit 96 coincides in time with the output pulse from the monostable multivibrator 94. Thus, the AND gate 95 produces an output only when the two input signals are applied thereto simultaneously. Consequently, it can be seen that the receiver network is actuated only in response to a control signal having both a prescribed frequency and the prescribed timed relationship to the particular half cycle of the carrier on which it is superimposed.

In order to turn on the particular appliance associated with the receiver of FIG. 2 when the two input signals to the AND gate 95 coincide, the gate output is fed through an amplifier 99 to energize a relay 100 which is adapted to remain energized until the subseqeuent arrival of an "off" control signal. For example, the relay 100 may be connected to a pair of normally closed contacts which are opened upon energization of the "off" relay to be described below.

The operation of the receiver in response to an "off" control signal is similar to that described above in connection with the "on" control signal. Thus, a positive pulse is induced in the secondary magnetic core winding 93*b* and passed by the "off" diode D12 to a monstable multivibrator 101 which supplies a pulse to one input of an AND gate 102. The other input to the AND gate 102 is derived from the tuned tank circuit 96 so that gate produces an output pulse only when the two inputs arrive simultaneously. In order to turn the associated appliance off when the two gate inputs coincide, the output from the AND gate 102 is fed through an amplifier 103 to an "off" relay 104 which responds by de-energizing the "on" relay 100, thereby turning off the particular appliance associated with this receiver.

Though only one receiving circuit has been shown for responding to a particular superimposed control signal, it will be apparent that a plurality of such circuits may be provided with different phase shifting networks which are preset to respond to control signals appearing at different portions of the carrier wave half cycles, i.e., two different "control channels." Thus, a plurality of devices, such as home appliances or industrial equipment, may be controlled at different times by different time settings for the various channels. For example, a transmitting circuit, as shown in FIG. 1, and a plurality of receiving circuits, as shown in FIG. 2, can be connected to the A-C supply line in a residence or the like for causing selected appliances to be turned on and turned off at several different pre-selected times during the day. Additionally, it will be apparent that a plurality of such appliances can be associated with each receiving circuit for simultaneous operations, if so desired.

Figure 3:
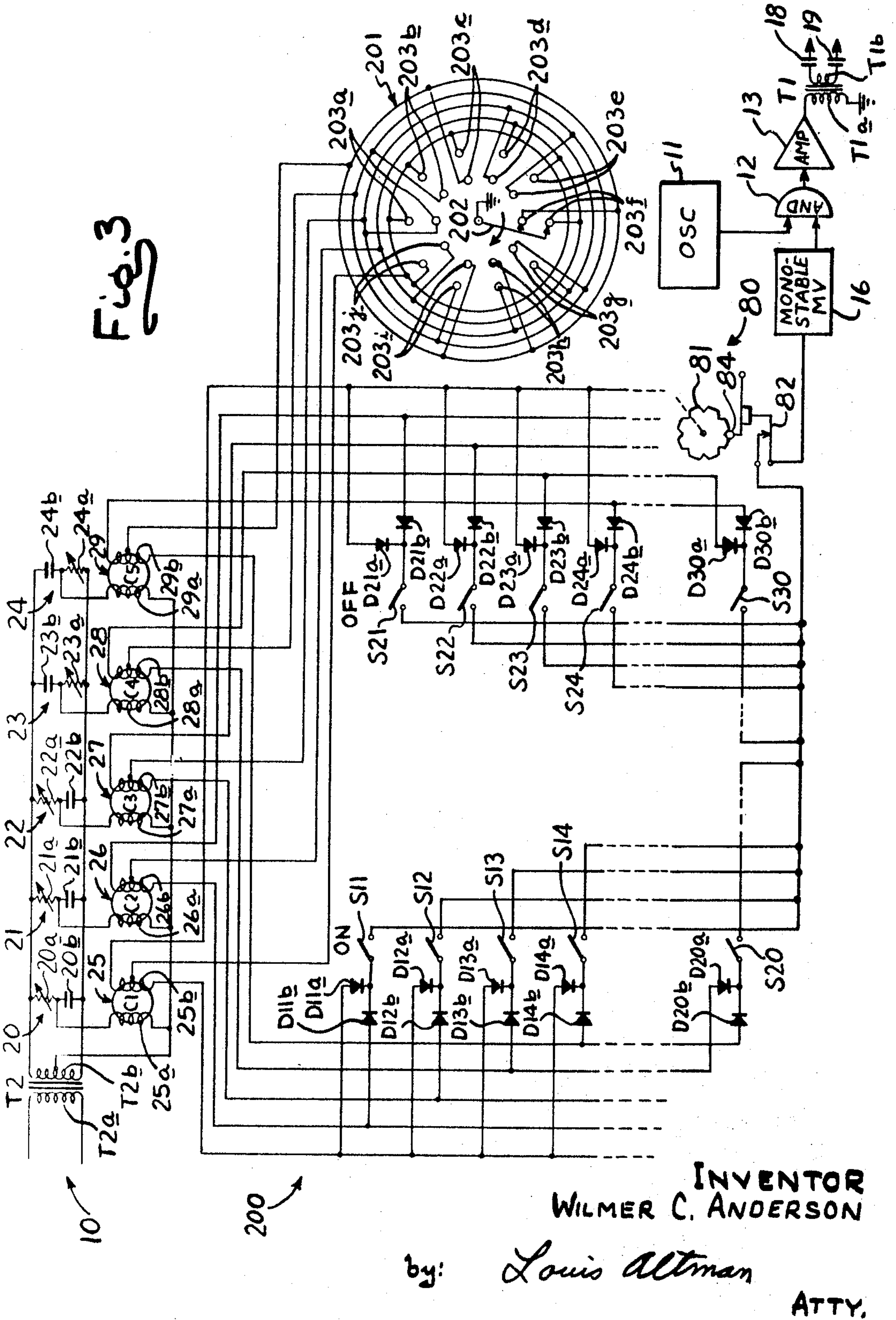
FIG. 3 is a schematic diagram of the circuit of a modified remote control system transmitter embodying the present invention.

In accordance with a further aspect of this invention, a greater number of control channels is attained for any given number of phase shifting networks by using a combination of two different control signals to make up each channel. This is achieved by modifying the time control means to render the superimposing means operative at pre-selected times to superimpose two signal bursts on the carrier wave at two different times during the same half cycle. A preferred system for carrying out this aspect of the invention is illustrated in FIG. 3 in which elements identical to those employed in the embodiment of FIG. 1 have been designated by the same reference characters used in FIG. 1. Thus, the phase shifting networks 20 through 24 and the magnetic core devices 25 through 29 at the input end of the system, as well as the oscillator 11 and the associated gating and superimposing means at the output end of the system are all similar to the corresponding elements described above in connection with FIG. 1.

With the five different phase shifting networks shown in FIG. 3, it is possible to achieve ten different pairs of control signals, and thus ten different control channels can be provided. Selection of the different pairs of control signals, as well as selection of the particular times for rendering each control channel operative, is effected by a selector switch bank indicated generally by the reference numeral 200. The various combinations of the negative or "on" pulses produced by the magnetic core devices are selected by a column of switches S11 through S20, with each switch being connected to a different combination of two magnetic core devices through a pair of corresponding diodes. Thus, the first switch S11 is connected to the secondary windings of magnetic core devices 25 and 26 through a pair of diodes **D11*a* and D11*b* which are adapted to pass only negative pulses induced in the core secondary windings. Similarly, the second switch S12 is connected through a pair of diodes D12*a* and D12*b* to magnetic core devices 25 and 27, and so on with each "on" switch S11 through S20** being connected to a different core pair so as to provide ten different combinations of output pulses.

The different combinations of positive or "off" pulses from the magnetic core devices are selected by a second column of switches S21 through S30, each of which is connected to the same pair of core devices as its counterpart in the first switch column S11 through S20. Thus, the first "off" switch S21 is connected to magnetic core devices 25 and 26 through a pair of diodes **D21*a* and D21*b* which are adapted to pass only positive pulses. The "off" switches S21 through S30 function in the same manner as the "on" switches S11 through S20 so that each switch controls a different combination of "off" pulses from the five magnetic core devices. It can now be seen that the switch bank 200 forms a total of ten channels, with each channel including both an "on" and "off" mode. For example, the first channel is represented by switches S11 and S21, with switch S11 representing the "on" mode and switch S21 representing the "off" mode. Whenever any one of the switches S11 through S30 is closed, the pulses applied to that particular switch are fed to the monostable multivibrator 16 during the one minute operative interval controlled by the cam operated control switch 80, and the multivibrator 16** actuates the gating and superimposing network described above in connection with FIG. 1.

In order to prevent the passage of more than one pair of output pulses from the magnetic code devices during any given half cycle of the alternating carrier waves, a commutator means is provided for successively connecting different pairs of the magnetic code devices to the associated selector switches so that only two signal bursts may be superimposed on the carrier wave during any given half cycle. Thus, referring to FIG. 3, a commutator 201 includes a wiper blade 202 which sweeps over ten spaced apart pairs of contacts **203*a* through 203*j*, with each pair of contacts being connected to a different pair of magnetic core devices. Consequently, output pulses from any given pair of core devices can be transmitted only when the wiper blade 202** is in engagement with the particular pair of contacts corresponding to that pair of core devices.

When any given selector switch S11–S30 is closed, it can transmit pulses from the two magnetic core devices and phase shifting networks associated with that switch only when the commutator wiper 202 is in engagement with the particular contact pair corresponding to that switch. For example, when switch S11 is closed at a preselected time, it transmits pulses from magnetic core devices 25 and 26 only during the interval when the wiper 202 is in engagement with contacts **203*j* so as to couple the circuit from the core devices 25 and 26 to ground. This interval may cover several half cycles of the 60-cycle carrier wave so that the selected pair of control signals will be superimposed on several half cycles, but only one pair of control signals can be superimposed on any given half cycle because the commutator wiper renders only one pair of core devices and associated phase shifting networks operative at any given instant. Thus, as the wiper 202 disengages from contacts 203*j*, no further pulses can be transmitted by switch S11 even though that switch remains closed. The wiper next engages contact pair 203*a*, thereby rendering core devices 25, 27 and associated phase shifting networks 20, 22 operative. Of course, pulses will be transmitted from this particular pair of core devices only when the associated "on" selector switch S12 or "off" selector switch S22 is closed, and the pulse transmission continues only as long as the wiper remains in engagement with contacts 203*a***.

Figure 4:
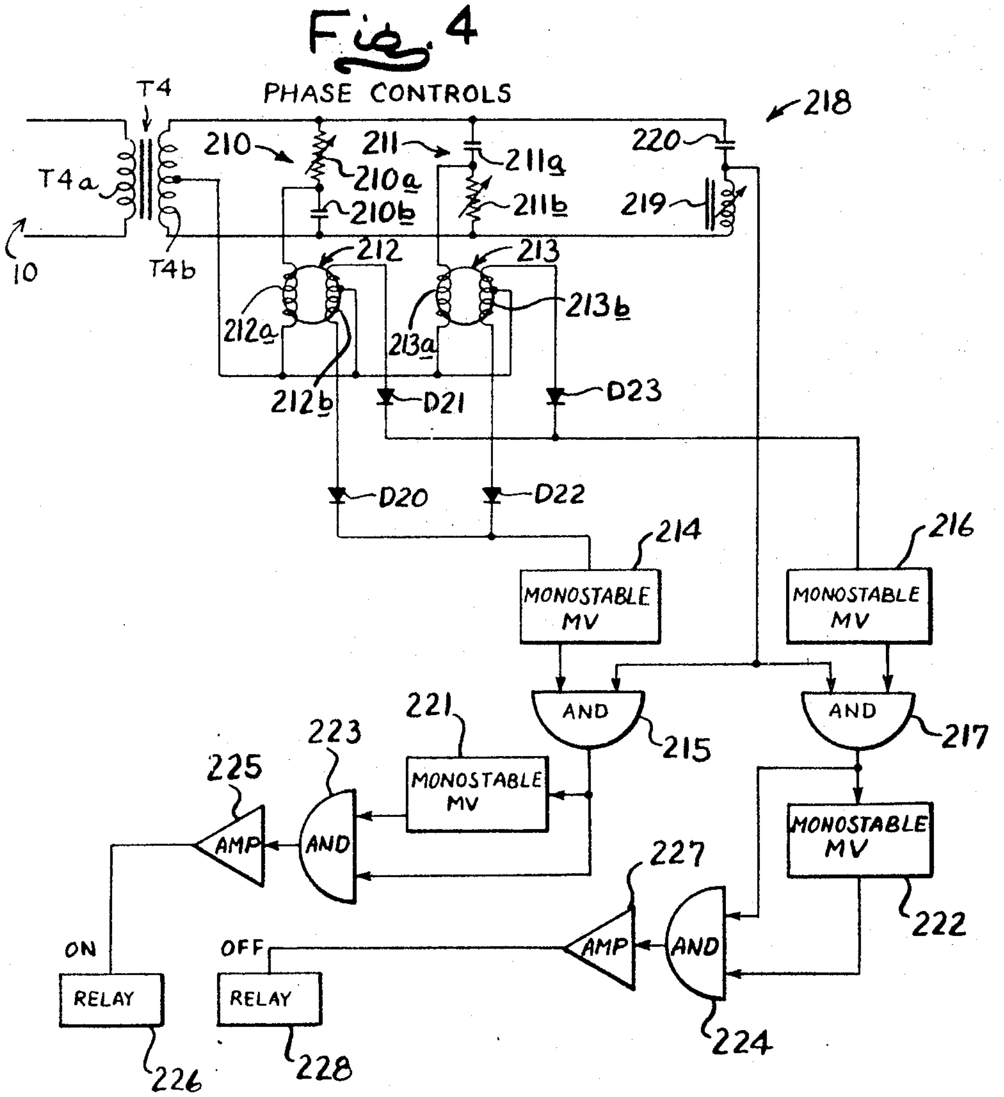
FIG. 4 is a schematic diagram of the circuit of a receiver for responding to control signals produced by the transmitter of FIG. 3.

As a further feature of the invention, receiver means are provided for detecting the presence of two or more control signals superimposed upon the same half cycle of a supply line carrier wave with each control signal having a different prescribed time relationship to the carrier wave, and for controlling a desired operation in response to the detection of such signals. Thus, the illustrative receiver shown in FIG. 4 is adapted to detect control signals transmitted by the ten-channel transmitter of FIG. 3, and then render a predetermined home appliance or other device operative or inoperative in response to the detection of such control signals. The receiver includes a pair of phase shifting networks 210 and 211 electrically associated with the main a.c. supply line 10 which powers the associated transmitter of FIG. 3. The two phase shifting networks 210, 211 comprise a pair of parallel series arrangements of variable resistors **210*a*, 211*a* and capacitors 210*b*, 211*b*, with both R-C series arrangements being connected across the secondary winding T4*b* of a transformer T4 which has its primary winding T4*a* connected to the main A-C supply line 10. As in the case of the transmitter circuits described above, the phase shifting networks 210, 211 are connected to the primary windings 212*a*, 213*a* of corresponding magnetic core devices 212, 213 so that the output pulses induced in the secondary windings 212*b*, 213*b*** of the core devices have prescribed time relationships to the main A-C supply voltage.

In order to discriminate between "on" and "off" output pulses induced in the secondary windings **212*b*, 213*b*, two pairs of oppositely facing diodes D20, D21, and D22, D23 are connected to opposite ends of the two secondary windings. Consequently, if a negative pulse is produced by either of the magnetic core devices 212, 213, corresponding to a positive half cycle on the A-C supply voltage, such pulse is passed by the "on" diodes D20, D22 to a monostable multivibrator 214 which responds by producing an output pulse to open an AND gate 215 for a brief interval. Similarly, if a positive pulse is produced by either magnetic core device 212, 213, corresponding to a negative half cycle of the A-C supply voltage, such pulses are passed by the "off" diodes D21, D23 to a second monostable multivibrator 216 which responds by producing an output pulse to open a second AND gate 217** for a brief interval.

For the purpose of detecting a prescribed pair of control signals superimposed on the supply line carrier wave during the brief interval when one of the AND gates 215, 217 is open, a tank circuit 218 is electrically associated with the supply line through the transformer T4, and is tuned to detect the presence of control signals having the prescribed frequency generated by the oscillator 11 in the transmitter circuit. As may be seen, the tank circuit 218 comprises a variable inductive element 219 which is coupled by means of the transformer T4 to the A-C supply line through a capacitor 220. Thus, whenever control signals having the prescribed frequency generated by the oscillator 11 appear on the carrier wave, the tank circuit 218 responds by applying an input voltage to the AND gates 215 and 217. However, this does not result in an output from either of the AND gates unless the input from the tank circuit 218 coincides in time with an output pulse from one of the monostable multivibrators 214 or 216. Accordingly, the AND gates 215, 217 produce an output only when the two input signals are applied thereto simultaneously, thereby indicating the presence of at least one of the pair of prescribed control signals. Whenever one of the AND gates 215, 217 produces an output, it triggers another monostable multivibrator 221 or 222 so as to open a corresponding AND gate 223 or 224. Since the second prescribed control signal has a different phase relationship to the carrier wave, as compared with the first control signal, it triggers the monostable multivibrator 214 or 216 a second time and, if the control signal is of the prescribed frequency as determined by the tank circuit 218, the AND gate 215 or 217 is opened a second time so as to pass a pulse through the AND gate 223 or 224 which has been previously opened. Thus it can be seen that the receiver network is actuated only in response to a predetermined pair of control signals having both a prescribed frequency and prescribed time relationships to the particular half cycle of the carrier on which they are superimposed.

In order to turn on the particular appliance associated with the receiver of FIG. 4 whenever an output appears at the AND gate 223, the gate output is fed through an amplifier 225 to energize a relay 226 which is adapted to remain energized until the subsequent arrival of an "off" control signal. When the selected "off" signal arrives, an output signal appears at the AND gate 224 and is passed through an amplifier 227 to actuate an "off" relay 228 which, in turn, de-energizes the "on" relay 226 to turn off the particular appliance associated with this receiver.

Having thus described that the circuitry and operation of each portion of the illustrative systems, an overall view of the operation of such systems will now be given. This will be done by describing a typical cycle of operation. The operator must first connect the desired number of appliances to be operated by each receiver of the type shown in FIG. 2 or FIG. 4. There may be any number of receivers employed to respond to the signals superimposed on the supply line carrier. Even if more than five different receivers are used in the system of FIGS. 1 and 2, for example, the system can only deliver five different daily programs of on-off operation, one such program for each of the five channels which the system is designed to provide. In employing more than five receivers, the operator merely sets up the system so that at least one of the channels controls a plurality of receivers. Of course, it is within the skill of the art to modify the transmitting circuits of FIGS. 1 and 3 to include any reasonable number of channels, and the exemplary numbers have been selected merely by way of illustration.

The next step is for the operator to tune the tank circuit of each receiver so that it responds to the frequency of the selected channel. The operator then decides which times of day to turn on and off the various appliances associated with each channel and programs the selector switches in the transmitter to bring this about.

The method of programming the selector switches is best appreciated from FIG. 5. Each of the selector switches has the instruction illustrated there, and all such switches may be mounted in side by side relationship on the same driven shaft 58 behind the panel 56. The cup-shaped wheel 62 of each switch protrudes through an opening in the panel 56 and also through a window in an escutcheon plate 56' which covers this panel opening. The fifteen minute intervals throughout the day from 00:15 a.m. to 11:45 p.m. are marked off about the outer periphery of each wheel 62. The remaining position is an "off" position, so marked on the periphery of the wheel. This "off" position is the one in which the latch member 65 restrains the cam follower 64 to hold the switch open even though the cam notch 57*a* passes thereunder. Each mark corresponds to one of the detented positions of the wheel. An indicator arrow on the escutcheon plate 56' matches up with the selected peripheral marking visible through the window of the escutcheon plate 56', and the wheel 62 protrudes far enough through the window so that it can be turned in the manner of a thumb wheel to alter the setting as designed. The face panel of the instrument would comprise a horizontal row of such escutcheon plate windows, enabling the operator to set each of the switches individually for setting up the desired program.

A typical program as set up on the panel just described would call for sending an "on" signal over a particular channel at a subsequent time of day. If desired, additional switches in the bank could be used to send subsequently a second "on" signal and still later a second "off" signal. The times at which the signals are sent are selectable in fifteen minute increments, and are read from the peripheral markings on the wheel 62. If it is desired not to actuate a particular appliance at all or to operate it only once during a given day, then the appropriate switches are disabled by rotating them to their "off" positions.

As can be seen from the foregoing detailed description, the present invention provides an improved remote control system in which a plurality of different control channels are achieved by the use of a single frequency signal. The control signals are superimposed on an alternating supply line carrier wave for only a short period during selected half cycles of the carrier wave, and a plurality of remote receiving devices are tuned to respond to different control channels corresponding to different portions of selected half cycles of the carrier wave. Consequently, any given receiving device can be tuned to any control channel even though the different channels are achieved by the use of a single frequency control channel. Moreover, by superimposing pairs or higher multiples of control signals on the carrier wave, a relatively large number of control channels can be divided by the use of the single frequency control signal.

I claim as my invention:

1. In a circuit for superimposing control signals on a supply line carrier, the combination which comprises an oscillator for providing an alternating output having a desired frequency, means responsive to the oscillator output for superimposing bursts of a signal corresponding to the oscillator output on the supply line carrier, a plurality of magnetic core devices each having a primary winding operatively connected to the A-C supply line for inducing magnetic flux in the respective cores and each having a secondary winding operatively associated with said oscillator for producing periodic output pulses in response to saturation of the respective cores for actuating said oscillator, and a plurality of phase shifting networks each of which is operatively associated with one of said magnetic core devices for controlling the time relationship of said output pulses to the half cycles of said carrier and thereby controlling the phase relationship between said carrier and said signal bursts.

2. In a circuit for superimposing control signals on an alternating supply line voltage carrier, the combination which comprises an oscillator for producing an alternating output having a prescribed frequency substantially higher than the frequency of the alternating supply line voltage carrier, means responsive to the oscillator output for superimposing an alternating control signal corresponding to the oscillator output on said carrier, gating means operatively associated with said oscillator for controlling the application of the oscillator output to the superimposing means, a plurality of magnetic core devices responsive to the alternating half cycles of said carrier for producing periodic output pulses for actuating said gating means to apply short bursts of the oscillator output to the superimposing means whereby short bursts of the control signal are superimposed on selected half cycles of the alternating carrier, a plurality of phase shifting networks operatively associated with said magnetic core devices for controlling the time relationship of said output pulses to said carrier whereby said pulses are produced in sequence during each half cycle of said carrier, and time control means including a plurality of selector switches operatively associated with said magnetic core devices for controlling the actuation of said gating means by the output pulses from the magnetic core device whereby said gating means is actuated at preselected times by pulses having predetermined time relationships to the half cycles of the carrier so that the signal bursts are superimposed on predetermined portions of said half cycles at said preselected times.

3. In a circuit for superimposing control signals on an alternating supply line voltage carrier, the combination which comprises an oscillator for producing an alternating output having a prescribed frequency substantially higher than the frequency of the alternating supply line voltage carrier, means responsive to the oscillator output for superimposing an alternating control signal corresponding to the oscillator output on said carrier, gating means operatively associated with said oscillator for controlling the application of the oscillator output to the superimposing means, a plurality of magnetic core devices responsive to the alternating half cycles of said carrier for producing periodic output pulses for actuating said gating means to apply short bursts of the oscillator output to the superimposing means whereby short bursts of the control signal are superimposed on selected half cycles of the alternating carrier, a plurality of phase shifting networks operatively associated with said magnetic core devices for controlling the time relationship of said output pulses to said carrier whereby said pulses are produced in sequence during each half cycle of said carrier, and time control means including a plurality of selector switches operatively associated with said magnetic core devices for controlling the actuation of said gating means by the output pulses from the magnetic core device whereby said gating means is actuated at preselected times by pulses having predetermined time relationships to the half cycles of the carrier so that the signal bursts are superimposed on predetermined portions of said half cycles at said preselected times, and means responsive to the polarity of the output pulses from said magnetic core devices for superimposing the signal bursts on positive half cycles of the carrier in response to pulses of one polarity, and for superimposing bursts on negative half cycles of the carrier in response to pulses of the other polarity.

4. In a circuit for superimposing control signals on an alternating supply line voltage carrier, the combination which comprises an oscillator for producing an alternating output having a prescribed frequency substantially higher than the frequency of the alternating supply line voltage carrier, means responsive to the oscillator output for superimposing an alternating control signal corresponding to the oscillator output on said carrier, gating means operatively associated with said oscillator for controlling the application of the oscillator output to the superimposing means, a plurality of magnetic core devices responsive to the alternating half cycles of said carrier for producing periodic output pulses for actuating said gating means to apply short bursts of the oscillator output to the superimposing means whereby short bursts of the control signal are superimposed on selected half cycles of the alternating carrier, a plurality of phase shifting networks operatively associated with said magnetic core devices for controlling the time relationship of said output pulses to said carrier whereby said pulses are produced in sequence during each half cycle of said carrier, and time control means including a plurality of selector switches operatively associated with said magnetic core devices for controlling the actuation of said gating means by the output pulses from the magnetic core device whereby said gating means is actuated at preselected times by pulses having predetermined time relationships to the half cycles of the carrier so that the signal bursts are superimposed on predetermined portions of said half cycles at said preselected times, each of said selector switches being operatively associated with two of said magnetic core devices so as to superimpose two different signal bursts on the selected half cycles of the carrier at said preselected times.

5. In a circuit for superimposing control signals on an alternating supply line voltage carrier, the combination which comprises an oscillator for producing an alternating output having a prescribed frequency substantially higher than the frequency of the alternating supply line voltage carrier, means responsive to the oscillator output for superimposing an alternating control signal corresponding to the oscillator output on said carrier, gating means operatively associated with said oscillator for controlling the application of the oscillator output to the superimposing means, a plurality of magnetic core devices responsive to the alternating half cycles of said carrier for producing periodic output pulses for actuating said gating means to apply short bursts of the oscillator output to the superimposing means whereby short bursts of the control signal are superimposed on selected half cycles of the alternating carrier, a plurality of phase shifting networks operatively associated with said magnetic core devices for controlling the time relationship of said output pulses to said carrier whereby said pulses are produced in sequence during each half cycle of said carrier, and time control means including a plurality of selector switches operatively associated with said magnetic core devices for controlling the actuation of said gating means by the output pulses from the magnetic core device whereby said gating means is actuated at preselected times by pulses having predetermined time relationships to the half cycles of the carrier so that the signal bursts are superimposed on predetermined portions of said half cycles at said preselected times, each of said selector switches being operatively associated with two of said magnetic core devices so as to superimpose two different signal bursts on the selected half cycles of the carrier at said preselected times, and a commutator operatively associated with said magnetic core devices for successively connecting different pairs of said magnetic core devices to said selector switches whereby only two signal bursts may be superimposed on the carrier during any given half cycle thereof.

6. In a remote control system associated with a supply line, the combination which comprises an oscillator for providing an alternating output having a predetermined frequency higher than that of the supply line carrier, electrical control means operatively associated with said oscillator and said supply line for superimposing a control signal corresponding to the oscillator output on the the supply line carrier at different prescribed time intervals during selected half cycles of said carrier so as to provide a plurality of different control channels, and a plurality of separate remotely located receiver means electrically associated with the supply line and responsive to a control signal having said predetermined frequency and superimposed on said supply line carrier, each of said receiver means being responsive to said control signal at a preselected one of said prescribed time intervals during a selected half cycle for controlling a desired operation.

7. In a remote control system associated with a supply line, the combination which comprises an oscillator for providing an alternating output having a predetermined frequency higher than that of the supply line carrier, means responsive to the oscillator output for superimposing a control signal corresponding to the oscillator output on the supply line carrier, means for controlling the phase relationship between said control signal and said carrier so as to superimpose said control signal on the supply line carrier at different prescribed time intervals during selected half cycles to provide a plurality of different control channels, and a plurality of remotely located receiver means including a phase shifting network operatively associated with the supply line for detecting a control signal having said predetermined frequency and superimposed on said supply line carrier, each of said receiver means being responsive to said control signal with a prescribed phase relationship to said carrier for controlling a desired operation.

8. In a remote control system associated with a supply line, the combination which comprises an oscillator for providing an alternating output having a predetermined frequency higher than that of the supply line carrier, means responsive to the oscillator output for superimposing a control signal corresponding to the oscillator output on the supply line carrier, and means for controlling the phase relationship between said signal and said carrier so as to superimpose said control signal on the supply line carrier at different prescribed time intervals during selected half cycles to provide a plurality of different control channels, a plurality of remotely located receiver means electrically associated with the supply line and responsive to a control signal having said predetermined frequency and superimposed on said supply line carrier for controlling a desired operation, each of said receiver means including at least one phase shifting network for discriminating among various control signals superimposed on said carrier with different phase relationships and for selecting a particular control signal having a prescribed phase relationship to said carrier.

9. In a remote control system associated with a supply line, the combination which comprises an oscillator for providing an alternating output having a predetermined frequency higher than that of the supply line carrier, electrical control means operatively associated with said oscillator and said supply line for superimposing a control signal corresponding to the oscillator output on the supply line carrier at different prescribed time intervals during selected half cycles of said carrier so as to provide a plurality of different control channels, a plurality of remotely located receiver means electrically associated with the supply line for controlling a desired operation, each of said receiver means including first control means responsive to positive half cycles of said carrier for detecting a control signal having said predetermined frequency and superimposed on said supply line carrier at a preselected one of said prescribed time intervals during a selected positive half cycle, and second control means responsive to negative half cycles of said carrier for detecting a control signal having said predetermined frequency and superimposed on said supply line carrier at a preselected one of said prescribed time intervals during a selected negative half cycle.

10. For use in a remote control system associated with a supply line and including an oscillator for providing an alternating output having a predetermined frequency, means responsive to the oscillator output for superimposing a control signal corresponding to the oscillator output on the supply line carrier, and means for controlling the phase relationship between said signal and said carrier so as to provide a plurality of different control channels, receiver means electrically associated with the supply line for controlling a desired operation, said receiver means including a magnetic core device having a primary winding operatively connected to the supply line for inducing magnetic flux in the core and having a secondary winding for producing periodic output pulses in response to saturation of the core, a phase shifting network operatively associated with said magnetic core device for controlling the time relationship of said output pulses to the half cycles of said carrier, a tuned circuit for producing an output in response to a control signal having said predetermined frequency, and gate means operatively associated with the secondary winding of said magnetic core device and with said tuned circuit for providing an output when the outputs from said secondary winding and said tuned circuit coincide with each other in time.

11. In a remote control system associated with a supply line, the combination which comprises an oscillator for providing an alternating output having a prescribed frequency higher than that of the supply line carrier, means responsive to the oscillator output for superimposing short bursts of a signal corresponding to the oscillator output on the supply line carrier at different predetermined time intervals during selected half cycles of said carrier for providing a plurality of different control channels, and time control means for rendering said superimposing means operative at preselected times to superimpose at least two signal bursts on said carrier at at least two different times during the same half cycle of said carrier, and a plurality of remotely located receiver means electrically associated with the supply line and responsive to control signals having said prescribed frequency for controlling a desired operation, at least one of said receiver means including at least two phase shifting networks for detecting a corresponding number of control signals superimposed on said supply line carrier at at least two different times during the same half cycle of said carrier.

12. For use in a remote control system associated with a supply line and including an oscillator for providing an alternating output having a prescribed frequency, means responsive to the oscillator output for superimposing short bursts of a control signal corresponding to the oscillator output on the supply line carrier at predetermined times during selected half cycles of said carrier for providing a plurality of different control channels, and time control means for rendering said superimposing means operative at preselected times to superimpose at least two signal bursts on said carrier at at least two different times during the same half cycle of said carrier, receiver means comprising at least two magnetic core devices each having a primary winding operatively connected to the supply line for inducing magnetic flux in the respective cores and each having a secondary winding for producing periodic output pulses in response to saturation of the respective cores, at least two phase shifting networks each of which is operatively associated with one of said magnetic core devices for controlling the time relationship of said output pulses to the half cycles of said carrier, a tank circuit operatively connected to the supply line and tuned to resonance with said prescribed frequency of the control signal, a pair of gating systems for providing an output to control a desired operation in response to time coincidence between the two output pulses from said secondary windings and at least two output pulses from said tuned circuit, first control means responsive to first polarity half-cycles of said carrier for passing output pulses from said secondary windings to one of said gating systems, and second control means responsive to a second polarity half cycles of said carriers for passing output pulses from said secondary windings to the other gating system.

13. In a remote control system associated with a supply line, the combination which comprises an oscillator for providing an alternating output having a desired frequency higher than that of the supply line carrier, means responsive to the oscillator output for superimposing a signal corresponding to the oscillator output on the supply line carrier, means for controlling the phase relationship between said signal and said carrier so as to superimpose said control signal on the supply line carrier at different prescribed time intervals during selected half cycles to provide a plurality of different control channels, time control means for rendering said superimposing means operative at preselected times so as to control the time of operation of the remote receivers actuated by said control channels and a plurality of remotely located receiver means electrically associated with the supply line and responsive to a control signal having said desired frequency and superimposed on said supply line carrier, each of said receiver means being responsive to said control signal at a preselected one of said prescribed time intervals during a selected half cycle for controlling a desired operation.

14. In a remote control system associated with a supply line, the combination which comprises an oscillator for providing an alternating output having a predetermined frequency higher than that of the supply line carrier, means responsive to the oscillator output for superimposing bursts of a signal corresponding to the oscillator output on the supply line carrier, a plurality of phase shifting networks operatively associated with the supply line and the oscillator for controlling the phase relationship between said carrier and said signal bursts so as to superimpose said control signal on the supply line carrier at different precribed time intervals during selected half cycles to provide a plurality of different control channels, and a plurality of remotely located receiver means electrically associated with the supply line and responsive to a control signal having said predetermined frequency and superimposed on said supply line carrier for controlling a desired operation, each of said receiver means including at least one phase shifting network for discriminating among various control signals superimposed on said carrier with different phase relationships and for selecting a particular control signal having a prescribed phase relationship to said carrier.

15. In a remote control system associated with a supply line, the combination which comprises an oscillator for providing an alternating output having a predetermined frequency higher than that of the supply line carrier, means responsive to the oscillator output for superimposing bursts of a signal corresponding to the oscillator output on the supply line carrier, a plurality of phase shifting networks operatively associated with the supply line and the oscillator for controlling the phase relationship between said carrier and said signal bursts, control means for selecting different phase shifting networks and rendering said superimposing means operative at preselected times so as to produce different carrier-signal composites at different preselected time intervals, and a plurality of remotely located receiver means electrically associated with the supply line and responsive to a control signal having said predetermined frequency and superimposed on said supply line carrier for controlling a desired operation, each of said receiver means including at least one phase shifting network for discriminating among various control signals superimposed on said carrier with different phase relationships and for selecting a particular control signal having a prescribed phase relationship to said carrier.

16. In a remote control system associated with a supply line, the combination which comprises an oscillator for providing an alternating output having a desired frequency higher than that of the supply line carrier, means responsive to the oscillator output for superimposing bursts of a signal corresponding to the oscillator output on the supply line carrier, a plurality of phase shifting networks operatively associated with the supply line and the oscillator for controlling the phase relationship between said carrier and said signal bursts, first control means responsive to positive half cycles of said carrier for selecting different phase shifting networks and rendering said superimposing means operative at preselected time intervals during said positive half cycles, second control means responsive to negative half cycles of said carrier for selecting different phase shifting networks and rendering said superimposing means operative at preselected time intervals during said negative half cycles, and a plurality of remotely located receiver means electrically associated with the supply line for controlling desired operations, each of said receiver means including first control means responsive to positive half cycles of said carrier for detecting a control signal having said predetermined frequency and superimposed on said supply line carrier at a preselected one of said prescribed time intervals during a selected positive half cycle, and second control means responsive to negative half cycles of said carrier for detecting a control signal having said predetermined frequency and superimposed on said supply line carrier at a preselected one of said prescribed time intervals during a selected negative half cycle.

17. In a remote control system associated with a supply line, the combination which comprises an oscillator for providing an alternating output having a desired frequency higher than that of the supply line carrier, means responsive to the oscillator output for superimposing a signal corresponding to the oscillator output on the supply line carrier, means for controlling the phase relationship between said signal and said carrier so as to superimpose said control signal on the supply line carrier at different prescribed time intervals during selected half cycles to provide a plurality of different control channels, control means including a plurality of selector switches operative at preselected times during selected half cycles of the A-C carrier for rendering said oscillator and said superimposing means operative at said preselected times, different selector switches being operatively associated with different phase shifting networks for selecting a predetermined phase relationship between said carrier and said signal bursts at each of said preselected times, and a plurality of remotely located receiver means electrically associated with the supply line and responsive to a control signal having said desired frequency and superimposed on said supply line carrier, each of said receiver means being responsive to said control signal at a preselected one of said prescribed time intervals during a selected half cycle for controlling a desired operation.

18. In a remote control system associated with a supply line, the combination which comprises an oscillator for providing an alternating output having a prescribed frequency higher than that of the supply line carrier, means responsive to the oscillator output for superimposing short bursts of a signal corresponding to the oscillator output on the supply line carrier at predetermined times during selected half cycles of said carrier for providing a plurality of different control channels, time control means for rendering said superimposing means operative at preselected times to superimpose at least two signal bursts on said carrier at at least two different times during the same half cycle of said carrier for actuating a remote receiver, and a plurality of remotely located receiver means electrically associated with the supply line and responsive to control signals having said prescribed frequency for controlling a desired operation, at least one of said receiver means including at least two phase shifting networks for detecting a corresponding number of control signals superimposed on said supply line carrier at at least two different times during the same half cycle of said carrier.

19. In a remote control system associated with a supply line, the combination which comprises an oscillator for providing an alternating output having a prescribed frequency higher than that of the supply line carrier, means responsive to the oscillator output for superimposing short bursts of a signal corresponding to the oscillator output on the supply line carrier at predetermined times during selected half cycles of said carrier for providing a plurality of different control channels, time control means for rendering said superimposing means operative at preselected times to superimpose at least two signal bursts on said carrier at at least two different times during the same half cycle of said carrier for actuating a remote receiver, said time control means including a plurality of manually set selector switches for selecting different time relationships between said signal bursts and selected half cycles of said carrier at different preselected times so as to provide a plurality of different control channels for activating a plurality of remote receivers, and a plurality of remotely located receiver means electrically associated with the supply line and responsive to control signals having said prescribed frequency for controlling a desired operation, at least one of said receiver means including at least two phase shifting networks for detecting a corresponding number of control signals superimposed on said supply line carrier at at least two different times during the same half cycle of said carrier.

20. In a remote control system associated with a supply line, the combination which comprises an oscillator for providing an alternating output having a predetermined frequency higher than that of the supply line carrier, means for superimposing bursts of a signal corresponding to the oscillator output on the supply line carrier, a plurality of magnetic core devices operatively associated with the supply line carrier and with said superimposing means for producing periodic pulses for actuating said superimposing means, a plurality of phase shifting networks operatively associated with said magnetic core devices for controlling the time relationship of said periodic pulses to said carrier, time control means for selecting pulses having different time relationships to said carrier for actuating said superimposing means at different preselected time intervals whereby said signal bursts are superimposed on said carrier with different time relationships to said carrier at said different preselected times, and a plurality of remotely located receiver means electrically associated with the supply line and responsive to a control signal having said predetermined frequency and superimposed on said supply line carrier for controlling a desired operation, each of said receiver means including at least one phase shifting network for discriminating among various control signals superimposed on said carrier with different phase relationships and for selecting a particular control signal having a prescribed phase relationship to said carrier.

References Cited

UNITED STATES PATENTS

| | | | |
|---|---|---|---|
| 2,378,326 | 6/1945 | Rees et al. | 340—170 |
| 2,479,020 | 8/1949 | Pelmuder | 340—170 |
| 3,032,745 | 5/1962 | Hamer | 340—170 |
| 3,121,215 | 2/1964 | Kelar et al. | 340—170 X |

JOHN W. CALDWELL, Primary Examiner

H. I. PITTS, Assistant Examiner

U.S. Cl. X.R.

340—164, 166, 170, 171, 310